US007096040B1

(12) United States Patent
Scherzer et al.

(10) Patent No.: US 7,096,040 B1
(45) Date of Patent: Aug. 22, 2006

(54) PASSIVE SHAPABLE SECTORIZATION ANTENNA GAIN DETERMINATION

(75) Inventors: Shimon B. Scherzer, Sunnyvale, CA (US); Benjamin Friedlander, Palo Alto, CA (US); Deepa Ramakrishna, Santa Clara, CA (US)

(73) Assignee: Kathrein-Werke KG, Rosenheim (DE)

( * ) Notice: Subject to any disclaimer, the term of this patent is extended or adjusted under 35 U.S.C. 154(b) by 706 days.

(21) Appl. No.: 09/999,261

(22) Filed: Nov. 15, 2001

Related U.S. Application Data

(63) Continuation-in-part of application No. 09/878,599, filed on Jun. 11, 2001.

(51) Int. Cl.
*H04M 1/00* (2006.01)

(52) U.S. Cl. .................... 455/562.1; 455/446; 342/368

(58) Field of Classification Search ............ 455/562.1, 455/422.1, 446; 342/368, 371, 373; 343/754, 343/853
See application file for complete search history.

(56) References Cited

U.S. PATENT DOCUMENTS

| | | | | |
|---|---|---|---|---|
| 5,719,583 | A * | 2/1998 | Kanai | 342/378 |
| 6,094,166 | A | 7/2000 | Martek et al. | |
| 6,111,857 | A | 8/2000 | Soliman et al. | |
| 6,198,434 | B1 | 3/2001 | Martek et al. | |
| 6,388,621 | B1 * | 5/2002 | Lynch | 343/700 MS |

OTHER PUBLICATIONS

PCT International Search Report dated Feb. 14, 2003 in PCT/US02/36697.
U.S. Appl. No. 09/938,259, filed Aug. 23, 2001, Martek et al.
U.S. Appl. No. 09/878,599, filed Jun. 11, 2001, Scherzer et al.
U.S. Appl. No. 09/798,151, filed Mar. 2, 2001, Gary A. Martek.
U.S. Appl. No. 09/618,088, filed Jul. 17, 2000, Wong et al.

* cited by examiner

*Primary Examiner*—Lee Nguyen
(74) *Attorney, Agent, or Firm*—Fulbright & Jaworski LLP

(57) ABSTRACT

Disclosed are systems and methods which provide communication network antenna pattern configuration for optimized network operation. Preferably, a statistical smart antenna configuration is provided in which antenna patterns associated with various base stations of the communication network are configured to capitalize on the complex morphology and topology of the service area in providing optimized communications. Antenna patterns are preferably configured using merit based determinations, based upon link propagation conditions such as associated with the complex morphologies and topologies of the service area, to aggressively serve areas which are best served thereby while not serving areas which are best served by other network systems.

44 Claims, 7 Drawing Sheets

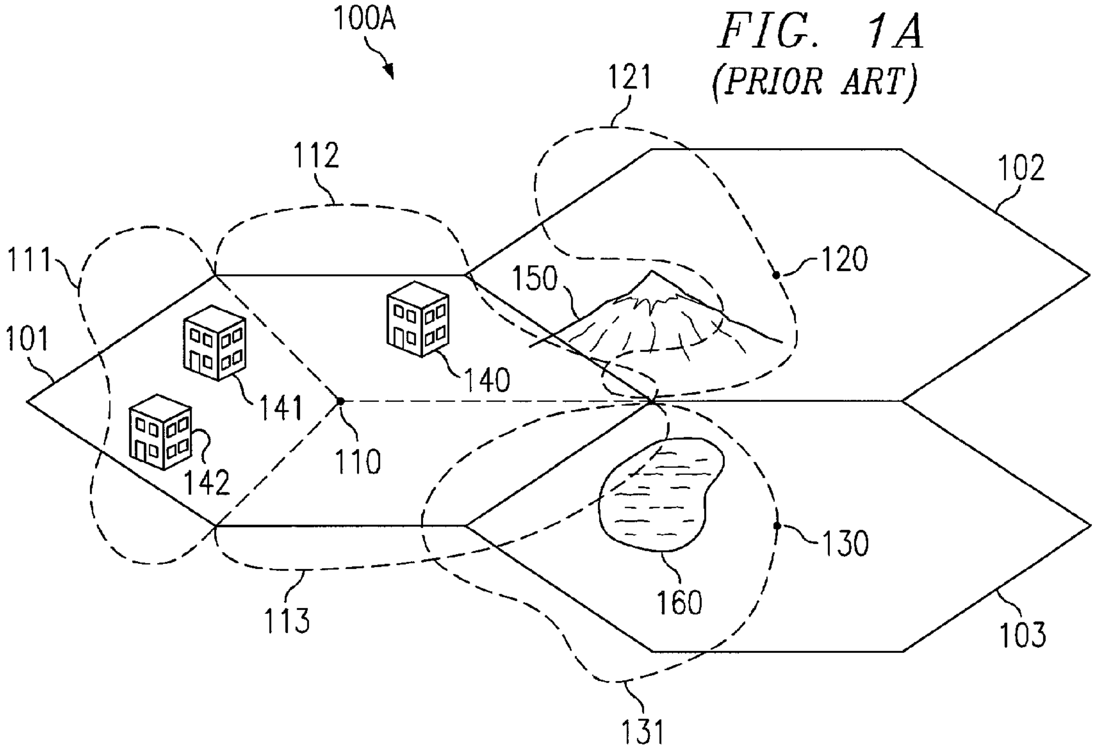
FIG. 1A
(PRIOR ART)
FIG. 2A
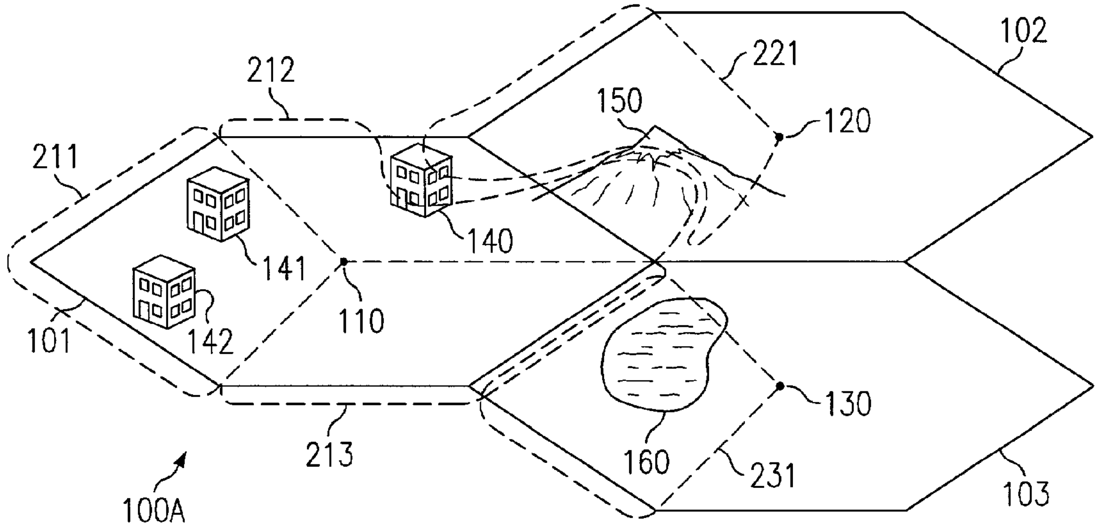

100B

PASSIVE SHAPABLE SECTORIZATION ANTENNA GAIN DETERMINATION

RELATED APPLICATIONS

The present application is a continuation-in-part of co-pending and commonly assigned U.S. patent application Ser. No. 09/878,599 entitled "Shapable Antenna Beams for Cellular Networks," filed Jun. 11, 2001, the disclosure of which is hereby incorporated herein by reference. The present application is related to the following co-pending and commonly assigned United States patent applications: Ser. No. 09/938,259 entitled "Dual Mode Switched Beam Antenna," filed Aug. 23, 2001, which is a continuation-in-part of Ser. No. 09/789,151 entitled "Dual Mode Switched Beam Antenna," filed Mar. 2, 2001, which itself is a continuation of Ser. No. 09/213,640, now U.S. Pat. No. 6,198,434, entitled "Dual Mode Switched Beam Antenna," filed Dec. 17, 1998; and Ser. No. 09/618,088 entitled "Base Station Clustered Adaptive Antenna Array," filed Jul. 17, 2000; the disclosures of all of which are hereby incorporated herein by reference.

TECHNICAL FIELD

The invention relates generally to wireless communications and, more particularly, to providing aggressive beam sculpting or contouring, such as for sector beams of a cellular base station, to thereby provide network optimization.

BACKGROUND

As wireless communications become more widely used, the number of individual users and communications multiply and, thus, communication system capacity and communication quality become substantial issues. For example, an increase in cellular communication utilization (e.g., cellular telephony, personal communication services (PCS), and the like) results in increased interference experienced with respect to a user's signal of interest due to the signal energy of the different users or systems in the cellular system. Such interference is inevitable because of the large number of users and the finite number of cellular communications cells (cells) and frequencies, time slots, and/or codes (channels) available.

In code division multiple access (CDMA) networks, for example, a number of communication signals are allowed to operate over the same frequency band simultaneously. Each communication unit is assigned a distinct, pseudo-random, chip code which identifies signals associated with the communication unit. The communication units use this chip code to pseudo-randomly spread their transmitted signal over the allotted frequency band. Accordingly, signals may be communicated from each such unit over the same frequency band and a receiver may despread a desired signal associated with a particular communication unit. However, despreading of the desired communication unit's signal results in the receiver not only receiving the energy of this desired signal, but also a portion of the energies of other communication units operating over the same frequency band. Accordingly, as the number of users utilizing a CDMA network increases, interference levels experienced by such users increase.

The quality of service (QOS) of communications and the capacity of the communication network are typically substantially impacted by interference or noise energy. CDMA systems are interference limited in that the number of communication units using the same frequency band, while maintaining an acceptable signal quality, is determined by the total energy level within the frequency band at the receiver. For example, the phenomena known as "pilot pollution" in CDMA systems manifests itself as pilot signal interference associated with reception by a particular subscriber communication unit of pilot signals of a number of base station communication units. For a base station to be received well by a subscriber unit the base station should have a strong pilot signal as received by the subscriber unit. However, the pilot signals of all other base stations received by the subscriber unit provide interference with respect to the other pilot signals. Accordingly, the strength of a particular pilot signal as received by a subscriber unit is not determined from absolute power of the signal, but instead is generally a ratio of signal or carrier to interference (C/I). Similar phenomena is experienced with respect to other communication protocols, e.g., global system for mobile (GSM) systems experience similar effects.

The QOS of communications with respect to communication units may be greatly affected by such interference, even though the power level of communication signals, e.g., pilot or beacon signals, are quite high. Accordingly, outage areas (locations where service is not supported) of cellular networks are often defined in terms of a noise or interference related threshold, such as establishing an acceptable C/I threshold. For example, in a CDMA system an outage area may be defined through use of a threshold such that the pilot Ec/Io (energy per chip of the pilot to the total received interference) is less than a predetermined threshold (e.g., −15 dB). GSM systems implementing frequency hopping schemes experience similar limitations with respect to interference.

Cellular communications systems have typically been conceptualized for analysis and planning purposes as a grid of hexagonal areas (cells) of substantially equal size disposed in a service area. A base transceiver station (BTS) having particular channels assigned thereto conceptually may be disposed in the center of a cell to provide uniform wireless communications throughout the area of the cell. Therefore, a grid of such cells disposed edge to edge in "honeycomb" fashion may be utilized for information with respect to the relative positions of a plurality of BTSs for providing wireless communications throughout a service area.

However, it should be appreciated that the communication coverage associated with a BTS typically varies substantially from the theoretical boundaries of the cell due to cell topology and morphology. For example, topological characteristics (mountains, valleys, etc.) and/or morphological characteristics (large buildings, different building heights, shopping centers, etc.) result in different path losses or other propagation attributes experienced in different azimuthal directions from the BTS. Accordingly, in practice homogeneous signal quality is not provided throughout the area of a cell or throughout the network.

Typically cells have been implemented as omni-trunks, where each cell is able to use each channel in the full 360° azimuth of a BTS, or sectored configurations, such as breaking the cells down into 120° sectors such that each cell channel communicates in the 120° azimuth an associated sector. However, because of the irregular boundaries experienced in actual cell implementations (e.g., path loss variance), a user moving about a cell and even a sector may experience a wide variety of communication conditions, including outage conditions (e.g., Ec/No <−15 dB) or poor quality of service. For example, this user may move only a few degrees in azimuth with respect to a BTS and experience significant signal quality degradation. Accordingly, this user may experience unacceptable communication conditions, such as the aforementioned outage conditions, when noise or interference levels are otherwise generally within acceptable limits for operation within the network.

Both the user's signal of interest, such as a serving pilot signal, and interference associated therewith are typically subject to log-normal shadowing. Accordingly, the communication conditions experienced are dependent on the variance of both.

It can therefore be appreciated that the capacity of the cell may be unnecessarily limited and/or the quality of communications provided thereby may be substandard if the quality of various signals of interest with respect to individual users is not maintained and/or interference energy is not controlled. A need therefore exists in the art for systems and methods which are adapted to provide optimized communications throughout a communication network.

BRIEF SUMMARY OF THE INVENTION

The present invention is directed to systems and methods which provide communication network antenna pattern configuration for optimized network operation. Accordingly, a preferred embodiment of the present invention provides a statistical smart antenna configuration in which antenna patterns associated with various base stations of the communication network are configured to capitalize on the complex morphology and topology of the service area in providing optimized communications. Antenna patterns of the preferred embodiment are preferably configured, based upon link propagation conditions such as associated with the complex morphologies and topologies of the service area, to aggressively serve areas which are best served thereby while not serving areas which are best served by other network systems.

Preferred embodiment techniques and methodologies for determining antenna pattern configurations according to the present invention, e.g., particular areas to aggressively serve and/or particular areas not to serve, utilize a merit based determination. Merit based determinations according to a preferred embodiment are made as a function a potential throughput evaluation. For example, in interference limited systems potential throughput may be established as a function of a signal quality metric, e.g., potential C/I, such that merit based determinations are made with respect to maximizing the signed quality metric throughout the network.

Antenna pattern configurations provided according to the present invention preferably optimize communications throughout a network. For example, antenna patterns associated with a particular antenna are preferably adapted to aggressively serve areas for which this particular antenna may be operated to provide optimum communication attributes, while allowing antenna patterns of other antennas to aggressively serve areas for which this particular antenna provides less than optimum communication attributes, thereby providing aggressive cell sculpting.

Implementing aggressive cell sculpting according to the present invention, preferred embodiments change a cell footprint to provide a desired cell boundary in response to cell topology and/or morphology features. Preferably, aggressive cell sculpting according to the present invention is provided as a function of radial variance of signal communication within a cell, e.g., variance of communication conditions throughout various degrees of azimuth, to thereby provide increased communication capacity and/or improved quality of service. Moreover, implementation of preferred embodiments of the present invention includes careful cell planning to provide load balancing to increase communication capacity and/or improve quality of service.

Preferred embodiments of the invention utilize antenna arrays having a relatively large number of antenna elements to provide aggressive beam sculpting. Such arrays are preferably coupled to a feed network providing desired signal manipulation, e.g., complex weighting of signals providing amplitude and/or phase relationships of signals associated with the antenna elements of the array, providing such beam sculpting.

Preferred embodiments of the present invention implement passive networks for providing aggressive beam sculpting, such as for sector beams of a cellular base station, to thereby provide antenna pattern contouring. Feed networks utilized according to the present invention preferably comprise microstrip line and/or air-line busses, or other passive feed circuitry, which may be relied upon to conduct signals and provided desired manipulation of attributes thereof. For example, air-line transmission lines may be adapted to provide desired signal power splitting, such as through providing junctions having desired impedance relationships, and/or delays, such as through providing line lengths associated with desired amounts of propagation delay.

The preferred embodiment feed networks provide a "personality module" which may be disposed at the masthead or tower-top with the aforementioned antenna array to provide operation as described herein. Accordingly, operation as described herein may be provided without deploying expensive signal processing equipment and/or signal processing equipment sensitive to operation in such environments at the masthead. Moreover, preferred embodiments, implementing such a personality module, may be deployed without requiring change to a cell site shelter and without substantially affecting system reliability.

The present invention may be used with a variety of air interfaces, such as any air interface used in cellular and personal communication services (PCS) networks, to provide improved operation as described herein. Additionally, antenna arrays adapted according to the present invention may be used in conjunction with signal diversity techniques, such as transmit diversity, if desired.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIGS. 1A and 1B show coverage associated with a typical prior art cellular network as may result from topological and morphological features;

FIGS. 2A and 2B show the result of cell sculpting according to the present invention;

DETAILED DESCRIPTION

Figure 1B:
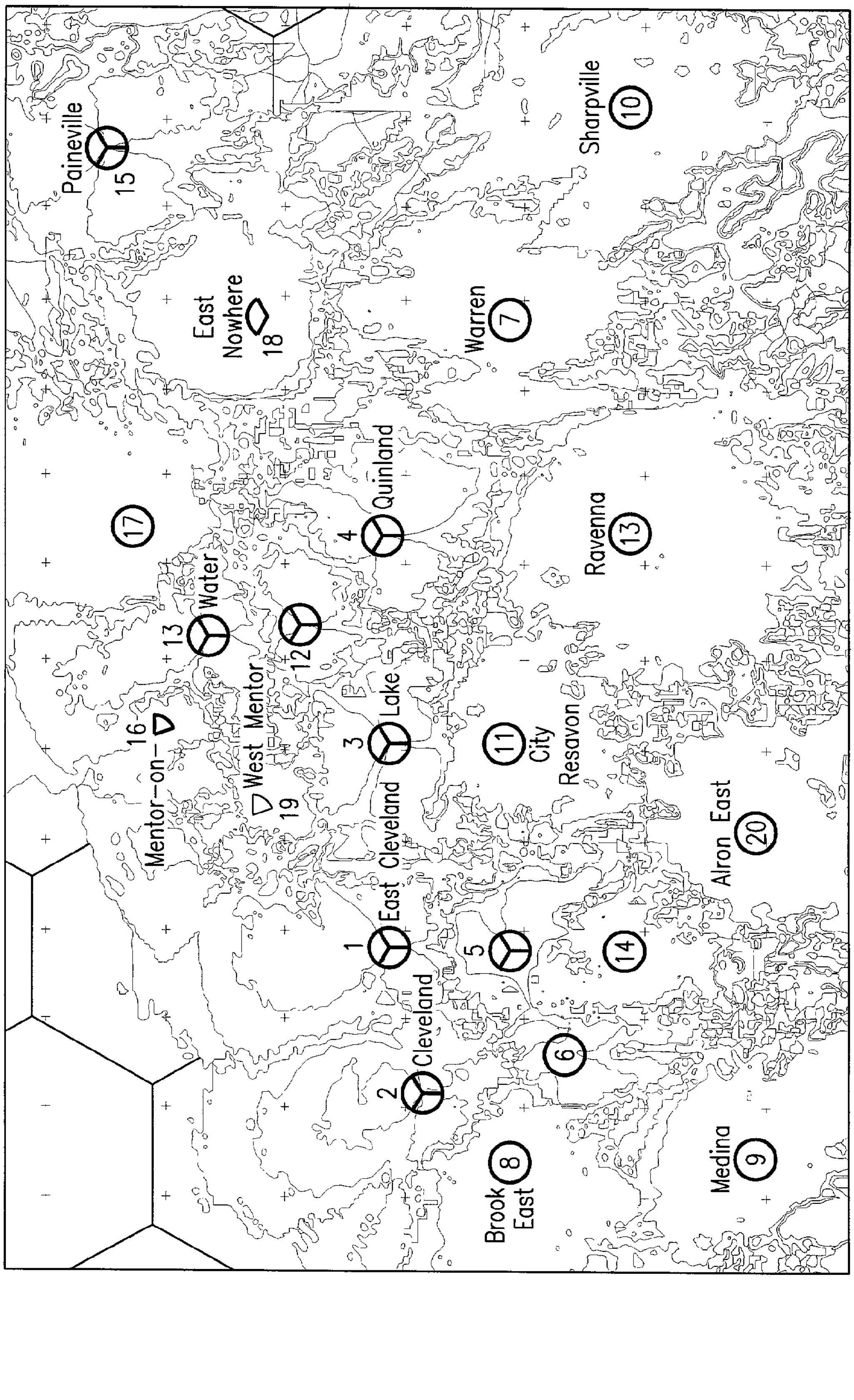
FIG. 1B (PRIOR ART)

As illustrated in FIG. 1A, cellular communications systems have typically been conceptualized for analysis and planning purposes as a grid of hexagonal areas (cells) of substantially equal size disposed in a service area. For example, cells 101, 102 and 103 of FIG. 1A are identified with the areas of communication associated with base transceiver stations (BTSs) 110, 120, and 130, respectively. Accordingly, service area 100A is provided communication services throughout by "honeycombed" deployment of such cells.

However, the communication coverage associated with a BTS may vary substantially from the theoretical boundaries of the hexagonal cell due to cell topology and morphology. For example, as shown in FIG. 1A cell 101 includes morphological features disposed therein. Accordingly, sector 112, having building 140 disposed therein, presents an antenna pattern contour appreciably different than the cell boundary the sector theoretically follows due to signal fading and/or shadowing associated therewith. Likewise, sector 111, having buildings 141 and 142 disposed therein, presents an antenna pattern contour appreciably different than the cell boundary that sector theoretically follows also due to signal fading and/or shadowing associated therewith. Similarly, cells 102 and 103 include topological features disposed therein. Accordingly, sector 121, having mountain 150 disposed therein, presents an antenna contour appreciably different than the cell boundary due to a significant shadow cast by the mountain. Sector 131, having lake 160 disposed therein, presents an antenna pattern contour appreciably different than the cell boundary due to omission of attenuating structure associated with the lake.

Although no topological or morphological features are illustrated within sector 113 of cell 101, the antenna pattern contour of sector 113 is illustrated to blossom beyond the boundary of the cell boundary. It is often attempted to address such an area of overlap, to varying degrees of success, through the use of down-tilt at the sector antenna. Such down-tilt is generally applied to all sectors of a typical prior art cellular system in an attempt to minimize areas of overlap between the cells.

It should be appreciated that the topological and morphological features illustrated in FIG. 1A are simplified in order to aid in understanding the present invention. Accordingly, an actual cellular deployment may include topological and morphological features substantially more complex than those illustrated, such as including many more features in a cell and/or a sector as well as mixing both morphological and topological features. Moreover, it should be appreciated that all such features which affect the propagation of communicated signals are not represented. For example, features such as trees, valleys, highways, and the like may significantly impact the contour of a cell. Additionally, such features may change over time, such as seasonally as with deciduous trees.

FIG. 1B presents a representation of the actual communication coverage provided by base transceiver stations (BTSs) of a typical cellular network. As shown in FIG. 1B, service area 100B includes BTSs 1–20, ones of which provide omni-directional, sectored, or directional communications with respect to a portion of service area 100B. Accordingly, each BTS of BTSs 1–20 presents an antenna pattern contour associated therewith. However, due to the complex topological and morphological features of the service area, these antenna pattern contours vary substantially from the theoretical hexagonal configuration discussed above. The portion of service area 100B served by each BTS, represented by the various shaded contours of FIG. 1B, illustrates the complex and irregular nature of the antenna beam contours likely to actually be experienced.

It can readily be seen from FIGS. 1A and 1B that there are outage areas (locations where service is not supported) within the cells. For example, due to the effects of signal shadowing, sector 121 (FIG. 1A) does not fully cover a corresponding portion of cell 102. Moreover, areas of outage are typically defined with reference to noise energy and, therefore, are more extensive than initially apparent. For example, in some cellular systems in common use today outage areas are determined as any area in which a particular pilot Ec/Io (energy per chip of the pilot to the total received interference) is less than a predetermined threshold, such as −15 dB. Accordingly, areas having high noise characteristics, such as the areas where sectors 112 and 121 overlap and where sectors 112 and 131 overlap, in addition to areas where a particular signal of interest receive strength is relatively low, may experience outage conditions. Moreover, both the user's signal of interest, such as a serving pilot signal, and interference associated therewith are typically subject to log-normal shadowing. Accordingly, the communication conditions experienced are dependent on the variance of both.

Because of the path loss variance experienced in actual cell implementations, a user moving about a cell and even a sector may experience a wide variety of communication conditions, including the aforementioned outage conditions, or poor quality of service. In CDMA networks, in particular, performance is directly related to interference control and, therefore, such path loss variances may significantly impact performance. GSM protocols have been migrating into the spread spectrum arena by adopting frequency hopping, bringing GSM systems closer to CDMA system characteristics (frequency reuse factor of 1). Accordingly, GSM networks are prone to appreciable performance degradation associated with path loss variance. For example, the user may move only a few degrees in azimuth with respect to a BTS and experience significant signal quality degradation.

However, the outage areas and areas in which poor signal quality is experienced are typically to be minimized in a communication network. For example, typical network designs strive to provide networks in which outage areas are not more than 2% of the network service area. Accordingly, such network designs often include the use of antenna down-tilt (i.e., directing the broadside of an antenna array a few degrees toward the ground) in an attempt to minimize areas of overlap between adjoining cells. However, such prior art techniques provide only limited success as they are not fully responsive to cell topology and morphology features.

Accordingly, preferred embodiments of the present invention implement aggressive cell sculpting to change a cell footprint and provide a desired cell boundary in response to cell topology and/or morphology features and may be used with a variety of air interfaces, including all air interfaces used with cellular and PCS communication systems. Preferably, cell sculpting according to the present invention provides air link signals adapted with respect to the particular path loss differentials experienced and, therefore, optimizes signal energy within a cell and throughout the network.

Directing attention to FIG. 2A, the cells of FIG. 1A are shown having benefit of the present invention to provide cell boundaries adapted to maximize system throughput and/or minimize overall transmit power for a given service level. Preferably, cell sculpting according to the present invention remediates the radial variance of signal communication shown in FIG. 1A such that antenna gain of a particular antenna or BTS (an "advantaged" antenna or BTS) is emphasized to aggressively serve a patch (a position within or portion of a service area) for which the advantaged antenna may be operated to provide optimum communication attributes and de-emphasize antenna gains of other antennas or BTSs ("disadvantaged" antennas BTSs) capable of illuminating the patch.

Figure 2B:
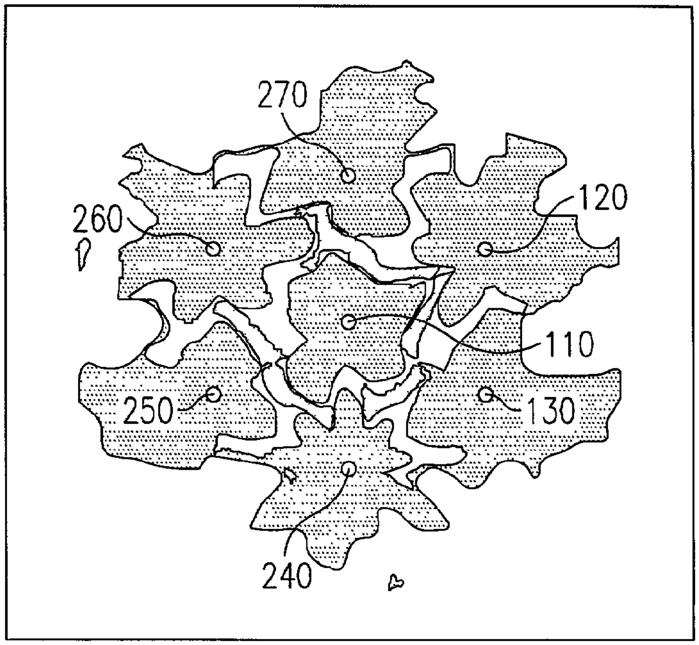
Figure 3:
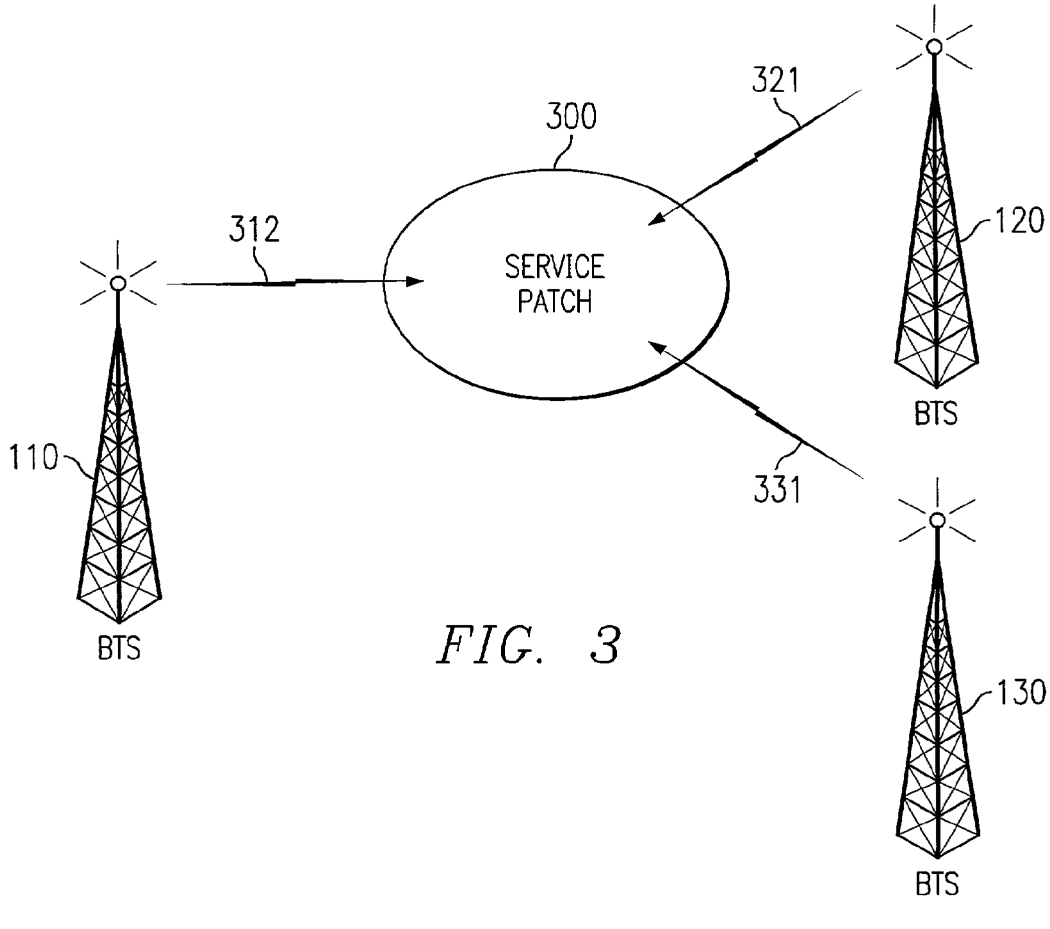
FIG. 3 shows the signal paths between a subscriber unit and a plurality of base stations resulting in pilot pollution.

To better understand the above described concept of advantaged and disadvantaged antennas or BTSs, attention is directed toward FIG. 3. In FIG. 3, the signal paths between each of BTSs 110–130 of FIG. 2A and a particular position or portion of service area 100A (patch 300) are shown as signal paths 312, 321, and 331, respectively. It should be appreciated that, although each of BTSs 110–130 may have a corresponding signal path to patch 300 associated therewith, one or more such signal paths may provide superior propagation attributes and, correspondingly, one or more such signal paths may provide inferior propagation attributes. For example, signal path 321 may suffer from the effects of morphological and/or topological features, such as mountain 150 (FIG. 2A) and therefore result in inferior propagation conditions associated with shadowing. Additionally, although signal paths 312 and 331 may be similarly affected by morphological and/or topological features, patch 300 may be disposed more near BTS 110, thus resulting in signal path 312 providing superior propagation attributes with respect to signal paths 321 and 331. Accordingly, in this example BTS 110 and its antenna associated with signal path 312 provides an advantaged BTS and antenna while BTSs 120 and 130 and their antennas associated with signal paths 321 and 331 provide disadvantaged BTSs and antennas, although each BTS may provide a signal received at patch 300.

The concept of advantaged and disadvantaged BTSs is helpful in understanding the present invention as the quality of service (QOS) of communications and the capacity of the communication network are typically substantially impacted by interference or noise energy. CDMA systems are interference limited in that the number of communication units using the same frequency band, while maintaining an acceptable signal quality, is determined by the total energy level within the frequency band at the receiver. The phenomena known as "pilot pollution" in CDMA systems manifests itself as pilot signal interference associated with reception by a particular subscriber unit of pilot signals of a number of BTSs. For example, a subscriber unit operating within patch 300 of FIG. 3, although communicating with advantaged BTS 110, may experience substantial interference energy associated with the pilot signals of each of disadvantaged BTSs 120 and 130.

For a BTS to be received well by a subscriber unit the BTS should have a strong pilot signal as received by the subscriber unit. However, the pilot signals of all other BTSs received by the subscriber unit provide interference with respect to the other pilot signals. Accordingly, the strength of a particular pilot signal as received by a subscriber unit is not determined from absolute power of the signal, but instead is generally a ratio of signal or carrier to interference (C/I). Similar phenomena is experienced with respect to other communication protocols, e.g., global system for mobile (GSM) systems experience similar interference effects. The QOS of communications with respect to communication units may be greatly affected by such interference, even though the power level of communication signals, e.g., pilot or beacon signals, are quite high. Accordingly, outage areas (locations where service is not supported) of cellular networks are often defined in terms of a noise or interference related threshold, such as establishing an acceptable C/I threshold. For example, in a CDMA system an outage area may be defined through use of a threshold such that the pilot Ec/No (energy per chip of the pilot to the total received spectral density) is less than a predetermined threshold (e.g., −15 dB).

Directing attention again to FIG. 2A, the antenna patterns are adapted to optimize communications in light of various topological and morphological conditions, irrespective of theoretical cell boundaries, to thereby provide improved QOS, load balancing, and/or increased capacity. For example, BTS 120 may be disadvantaged with respect to providing communications for the BTS 110 side of mountain 150 and, therefore, BTS 110 may be advantaged with respect to this same portion of the service area. Accordingly, antenna pattern 212 is preferably sculpted according to the present invention (e.g., antenna gain at a corresponding azimuthal angle or angles is increased) to extend well beyond the boundary of cell 101 to serve the BTS 110 side of mountain 150. Correspondingly, antenna pattern 221 is preferably sculpted according to the present invention to retract well within the boundary of cell 102 and, thus, minimize pilot pollution experienced on the BTS 110 side of mountain 150. Similarly, BTS 110 may be disadvantaged with respect to providing communications for the BTS 120 side of building 140 and, therefore, BTS 120 may be advantaged with respect to this same portion of the service area. Accordingly, antenna pattern 221 is preferably sculpted according to the present invention to extend well beyond the boundary of cell 102 to serve the BTS 120 side of building 140. Correspondingly, antenna pattern 212 is preferably sculpted according to the present invention to retract well within the boundary of cell 101 and, thus, minimize pilot pollution experienced on the BTS 120 side of building 140.

It should be appreciated that the example of cell sculpting illustrated in FIG. 2A is substantially simplified to aid in the understanding of the concepts of the present invention. An actual implementation of the invention is likely to result in substantially more complex antenna pattern contours than those of FIG. 2A as well as portions of the service area in which the antenna pattern contours overlap to a degree. Directing attention to FIG. 2B, a Monte-Carlo simulation, in which seven cells of a network (cells 110, 120, 130, 240, 250, 260, and 270) are modeled, is shown. The dark shaded areas immediately surrounding each of cells 110, 120, 130, 240, 250, 260, and 270 represent the areas in which substantially only a single pilot signal is dominant and therefore a single BTS would be in handoff with respect to a subscriber unit therein. The lightest shaded areas, primarily adjacent to the above described dark shaded areas, represent the areas in which substantially only two pilot signals are dominant and therefore two BTSs would be in handoff with respect to a subscriber unit therein. The medium shaded areas represent the areas in which substantially only three pilot signals are dominant and therefore three BTSs would be in handoff with respect to a subscriber unit therein. As can be readily appreciated from the illustrated simulation results, cell sculpting according to the present invention may provide antenna pattern contours substantially more complex than those illustrated in FIG. 2A. Moreover, it should be appreciated that the network configured according to the present invention results in relatively little interference and, thus, also mitigates pilot pollution problems.

Preferred embodiments of the present invention utilize a merit figure in determining antenna pattern contours to be provided by aggressive beam sculpting according to the present invention. A figure of merit utilized according to a preferred embodiment of the invention is system potential throughput, e.g., maximum total bits per second for a given network.

In evaluating the potential throughput of a network according to a preferred embodiment of the present invention, a signal quality metric in the form of a potential C/I (pC/I) metric is used. As discussed above, in many networks the C/I experienced by a communication unit establishes the quality of communications and, often, whether useful communications are even possible. Accordingly, the potential throughput of many networks is directly related to the potential C/I associated with the communication units operating in the network.

For example, to evaluate the potential throughput of a network, such as a cellular network using CDMA protocols, potential C/I is preferably defined as the potential C/I at each point in the network if the network BTS transmit powers are held constant. Where it is assumed that all BTS antennas are omni-directional, the potential C/I may be represented as:

$$pC/I_i = \frac{G_i P_i / L_i}{\sum_{j \neq i} G_j P_j / L_j} = \frac{G_i}{L_i \sum_{j \neq i} G_j / L_j} \tag{1}$$

where i and j represent the $i^{th}$ and $j^{th}$ points or positions in the network, Pi and Pj represent the power associated with BTSi and BTSj, respectively, at the $i^{th}$ subscriber unit, Li and Lj represent the path loss from BTSi and BTSj, respectively, to the $i^{th}$ subscriber unit, and Gi and Gj represent the gain of BTSi and BTSj, respectively, antenna in the direction of the $i^{th}$ subscriber unit. It should be appreciated that the above representation of potential C/I includes only interference energy associated with the signals of BTSs within the network and, therefore, does not include other noise energy which may affect the potential C/I. Accordingly, this simplified representation assumes such other noise energy is constant throughout the network and may be ignored. Of course, a value associated with other noise energy may be added to the denominator above, if desired.

As stated above, it may be assumed that potential throughput of many networks is directly proportional to potential C/I. Accordingly, potential throughput may be represented as:

$$Throughput_i = pC/I_i \cdot U_i = \frac{U_i G_i P_i / L_i}{\sum_{j \neq i} G_j P_j / L_j} = \frac{U_i G_i}{L_i \sum_{j \neq i} G_j / L_j} \tag{2}$$

where Ui represents the subscriber density at the $i^{th}$ point or position in the network.

In determining antenna pattern contours according to the present invention a determination is preferably made as to the optimal arrangement for the network antenna gain profiles. From the above equation it is concluded according to the present invention that a best approach is to increase as much as possible the gain (G) that is associated with the smallest path loss, e.g., the gain profile of a particular BTS should be substantially inversely proportional to the path loss profile of the BTS. Accordingly, antenna gain in a direction of advantage with respect to the BTS is emphasized to aggressively serve a patch for which the BTS may be operated to provide optimum communication attributes and antenna gain in a direction of disadvantage is de-emphasized to allow BTSs which may be advantaged with respect to that direction to serve a corresponding patch. This preferred embodiment approach leads to two associated results: Reduction of mean BTS transmit power across the network; and reduction of the variance of the BTS transmit power.

It should be appreciated that the total antenna gain available from an array is a fixed resource. Accordingly, although the portion of the total gain which is provided in a particular direction may be selected, the aggregate gain provided according to any selected gain profile will be fixed. This constraint may be represented as:

$$\frac{1}{2\pi} \int_{-\pi}^{+\pi} G(\theta) = 1 \tag{3}$$

To determine the antenna pattern contour according to a preferred embodiment of the present invention, analysis may be performed with respect to communication associated with a single BTS in the network, with other BTSs assumed to provide only interference energy. Assume that the BTS uses an omni-directional antenna (i.e., unitary gain in all directions), path loss from the BTS to a subscriber unit at direction θ and distance r may be denoted as L(θ,r), the power transmitted by the BTS to the subscriber unit at direction θ may be denoted as $\overline{P}(\theta,r)$, and the interference experienced by the subscriber unit at direction θ may be denoted as I(θ,r). It should be appreciated that, although reference is made herein to polar coordinates, positions within the network may be represented using any convenient coordinate system, such as Cartesian coordinates, as desired.

The C/I of a signal transmitted from the BTS to a subscriber unit at direction θ may be represented as:

$$C/I = \frac{\overline{P}(\theta, r)}{L(\theta, r)I(\theta, r)} \tag{4}$$

From the above representation of C/I at a subscriber unit, it can be appreciated that in order to achieve a particular nominal C/I ($CI_0$) the power as transmitted by the BTS should be:

$$\overline{P}(\theta,r)=CI_0L(\theta,r)I(\theta,r) \tag{5}$$

$\overline{P}(\theta,r)$ establishes the amount of power needed to transmit from a BTS to maintain the nominal C/I at a subscriber unit. Assuming ideal power control is available at the BTS, it may be presumed that all subscriber units in communication with the BTS experience the same nominal C/I. Accordingly, $\overline{P}(\theta,r)$ may be utilized to represent the power profile of the BTS associated with providing a nominal C/I to each subscriber unit served by the BTS.

There are at least two factors which are important in optimizing antenna pattern contours according to a preferred embodiment of the present invention. One such factor is the path loss or loss profile of the BTS, which is included in the above equations as L(θ,r). Another such factor is the distribution of the subscriber units being served by the BTS. The distribution of subscriber units is useful according to a preferred embodiment of the present invention because, even if the BTS has particular areas with very low loss (e.g., a good line of sight), if statistically there are no subscriber units disposed in those areas, allocation of gain in the corresponding directions would be a waste of a limited resource. Accordingly, the subscriber unit density is also preferably considered in determining antenna pattern contouring according to the present invention.

The normalized subscriber unit density throughout an area served by the BTS may be represented as U(θ,r), where:

$$\frac{1}{2\pi}\int_{-\pi}^{\pi}\int_{0}^{R} U(\theta, r) r\, dr\, d\theta = 1 \tag{6}$$

and where R is the radius of the area served by the BTS (e.g., radius of a cell). If the BTS is serving $N_u$ subscriber units, then the subscriber unit density may be represented as $N_uU(\theta,r)$.

The total average power ($B_0$) associated with transmissions to the subscriber units served by the BTS may be determined from the above. Specifically, $B_0$ may be represented as:

$$B_0 = \frac{N_u}{2\pi}\int_{-\pi}^{\pi}\int_{0}^{R} U(\theta, r)\overline{P}(\theta, r)\, d\theta\, dr \tag{7}$$

$B_0$ may be simplified as:

$$B_0 = \frac{N_u}{2\pi}\int_{-\pi}^{\pi} P(\theta)\, d\theta \tag{8}$$

where:

$$P(\theta) = \int_{0}^{R} \overline{P}(\theta, r) U(\theta, r)\, dr \tag{9}$$

P(θ) in the above equation represents the total power transmitted by the BTS in direction θ. Therefore, P(θ) provides a power profile of the omni-directional BTS according to the present invention. Specifically, the power profile P(θ) provides information with respect to the BTS transmission power as provided throughout the azimuth by including not only the transmission power associated with each subscriber unit (equation (5)), but also the statistical distribution of the subscriber units (U(θ,r)) within the service area of the BTS.

However, if instead of an omni-directional antenna configuration as described above the BTS utilizes an antenna array adapted for directional communications (non-unitary gain in the azimuth), the gain of the BTS antenna may be taken into consideration in the above analysis. Power gain provided by a BTS antenna may be represented as G(θ). As discussed above, gain is a fixed resource and, therefore, the antenna gain is constrained as shown by equation (3) above.

Assuming that the path loss (L(θ,r)) and interference (I(θ,r)) remain unchanged, the power used to provide communication to the subscriber units at the same C/I as the omni-directional configuration will be modified by the antenna gain. Modifying the total BTS power equation shown above (equation (8)) to include gain, the total power utilized to provide communication to the subscriber units at the same C/I may be represented as:

$$B_1 = \frac{N_u}{2\pi}\int_{-\pi}^{\pi} \frac{P(\theta)}{G(\theta)}\, d\theta \tag{10}$$

The gain provided according to G(θ) above is a function of angle θ and, therefore, defines antenna gain azimuthally about the BTS. Accordingly, if in a particular direction that had unity gain in the omni-directional example above the gain is now increased by a factor of two, the BTS utilizing a directional configuration need only transmit one half the power in that direction to maintain the same C/I.

It should be appreciated that maximizing the C/I for subscriber units operating in the service area of the BTS is the same as minimizing the BTS transmit power to maintain a given C/I for each such subscriber unit. Accordingly, the optimization analysis becomes a question of what gain function G(θ) will minimize the transmit power used in providing desired C/I, or other communication attributes. Therefore, antenna pattern contours may be selected according to the present invention by choosing antenna gain so as to minimize the total power utilized. This presents a constrained optimization yielding:

$$G(\theta)=\frac{\sqrt{P(\theta)}}{\frac{1}{2\pi}\int_{-\pi}^{\pi}\sqrt{P(\theta)}\,d\theta} \tag{11}$$

$$B_1=\left(\frac{N_u}{2\pi}\int_{-\pi}^{\pi}\sqrt{P(\theta)}\,d\theta\right)^2 \tag{12}$$

From above, it can be seen that the gain G(θ) is preferably proportional to the square root of the power profile P(θ) divided by the average of the square root of the power profile P(θ). The above assumes that the gain, G(θ), can be chosen arbitrarily, subject to the above discussed constraints of equation (3).

The gain (F) of a system implementing antenna pattern contouring according to the above may be defined in terms of the ratio of the total power of the omni-directional configuration ($B_0$) to the total power of the directional gain adjusted configuration $$(B_1)\cdot F=\frac{\int_{-\pi}^{\pi}P(\theta)\,d\theta}{\left(\int_{-\pi}^{\pi}\sqrt{P(\theta)}\,d\theta\right)^2} \tag{13}$$

Accordingly, F is the factor by which the average BTS power is reduced when using antenna pattern contouring according to the present invention.

It should be appreciated that the above described preferred embodiment equations utilize continuous variables which often present difficulties in automated computation, such as requiring substantial computer processing power. Accordingly, the above equations may be discretized for simplified implementation, such as for simulation and other modeling, by evaluating θ on M points of a uniform grid from −π to π, to give $\theta_m$. Discretized versions of equations (3), (8), (10), (9), (11), (12), and (13), respectively, are provided below.

$$\frac{1}{M}\sum_{m=1}^{M}G(\theta_m)=1 \tag{14}$$

$$B_0=\frac{N_u}{M}\sum_{m=1}^{M}P(\theta_m) \tag{15}$$

$$B_1=\frac{N_u}{M}\sum_{m=1}^{M}\frac{P(\theta_m)}{G(\theta_m)} \tag{16}$$

where:

$$P(\theta_m)=\sum_{n=1}^{N}U(\theta_m,r_n)\overline{P}(\theta_m,r_n) \tag{17}$$

-continued $$G(\theta_m)=\frac{M\sqrt{P(\theta_m)}}{\sum_{m=1}^{M}\sqrt{P(\theta_m)}} \tag{18}$$

$$B_1=N_u\left(\frac{1}{M}\sum_{m=1}^{M}\sqrt{P(\theta_m)}\right) \tag{19}$$

$$F=\frac{M\sum_{m=1}^{M}P(\theta_m)}{\left(\sum_{m=1}^{M}\sqrt{P(\theta_m)^2}\right.} \tag{20}$$

Derivation of an optimal gain pattern may be accomplished using the Lagrange method as shown below.

$$f=\frac{N_u}{M}\sum_{m=1}^{M}\frac{P(\theta_m)}{G(\theta_m)}+\lambda\left(\frac{1}{M}\sum_{m=1}^{M}G(\theta_m)-1\right) \tag{21}$$

$$\frac{\partial f}{\partial G(\theta_m)}=-\frac{N_uP(\theta_m)}{MG(\theta_m)^2}+\lambda=0 \tag{22}$$

$$G(\theta_m)=\frac{\sqrt{\frac{N_u}{M}P(\theta_m)}}{\sqrt{\lambda}} \tag{23}$$

Inserting the above into the discretized antenna gain constraint equation (14), a discretized optimum gain profile may be determined as follows:

$$G(\theta_m)=\frac{\sqrt{P(\theta_m)}}{\frac{1}{M}\sum_{m=1}^{M}\sqrt{P(\theta_m)}} \tag{24}$$

It should be appreciated from the above that an optimal antenna pattern contour according to the present invention does not necessarily equalize the power transmitted to the different subscriber units, but rather distributes transmitted power to achieve desired communication attributes with respect to each subscriber unit while minimizing the total amount of transmit power used.

As can be appreciated from the above equations, antenna gain determination used in providing antenna pattern contouring according to preferred embodiments of the present invention utilizes path loss from the BTS to any relevant points around the BTS and a subscriber density estimate for that same area. This data may be derived from cellular network planning tools and/or drive test data. For example, network planning tools as are well known in the art may be used to predict path loss and/or subscriber unit densities, such as based upon known topological and morphological features, and drive tests or other empirical approaches may be utilized to refine the predictions. It may be expected, for example, that high rise office buildings and condominiums, shopping centers, and highways may have substantially increased subscriber unit density as compared to areas in which single family homes are situated. Since the most improvement in utilizing the present invention is expected to be experienced in dense urban environments, a most preferred embodiment network tool uses Ray Tracing methods as part of the planning tool.

Having the above data, an antenna pattern contour determination according to the present invention may be made according to the preferred embodiment steps set forth below. Of course, alternative steps and/or steps executed in an order different than the exemplary method set forth herein are possible according to the present invention.

Figure 4:
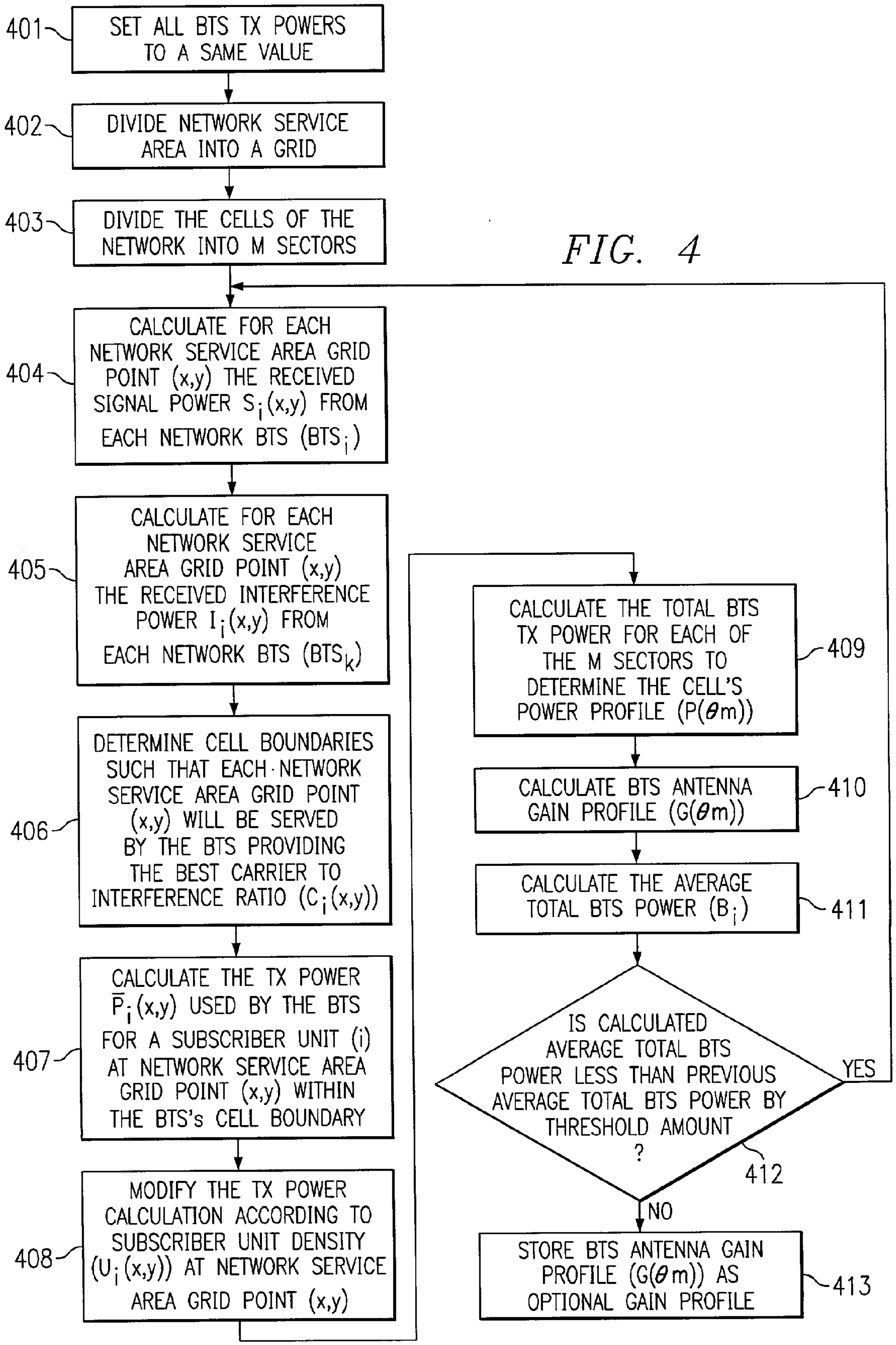
FIG. 4 shows the steps of a preferred embodiment method for determining antenna pattern contours according to the present invention.

Directing attention to FIG. 4, the steps of a preferred embodiment method for determining antenna pattern contours according to the present invention is shown. At step 401 the BTSs of a network service area, or portion thereof (e.g. cluster), are set to a same value with unity gain throughout their transmission aperture. It should be appreciated, in determining an antenna pattern contour for a particular network BTS according to preferred embodiments of the present invention, that interference energy from other network BTSs is considered. However, all BTSs in a network need not be considered with respect to a particular BTS as some network BTSs will be disposed at a distance and/or an orientation such that deminimis interference energy is experienced within the cell boundaries of the particular BTS. For example, a 2 km by 2 km area may be substantially all of a network service area considered as a potential cell boundary area of a particular BTS. However, a 5 km by 5 km area of the network, and its corresponding BTSs, may be considered in order to include interference sources primarily affecting the particular BTS's potential cell boundary. Accordingly, a seven cell network cluster portion, wherein a center cell is surrounded by six other network cells as is common with a hexagonal cellular plan, may be analyzed according to the preferred embodiment steps, for example, although the network may include a much greater area and many more BTSs.

At step 402, the network service area is divided into a coordinate grid (e.g., Cartesian or polar coordinate grid) for discretely identifying positions therein. For example, according to a preferred embodiment the above mentioned seven cell cluster network portion may be divided into a rectangular grid of 500 by 500 equally spaced lines. The level of resolution selected for gridding a service area according to the present invention is preferably selected as a function of the topology and/or morphology of the service area, such as by using a two dimensional Fourier transform. According to a preferred embodiment, the more complex the topological and/or morphological makeup of the service area, the finer the resolution of the selected grid.

At step 403, the cells are preferably divided into a plurality of sectors, e.g., m sectors. It should be appreciated that the sectors referenced herein need not be sectors associated with unique channel assignments and soft handoffs as in the prior art, but rather are preferably used in determining the resolution of the BTS azimuthal power profile. The number of sectors any particular cell is divided into is preferably selected substantially as discussed above with respect to gridding the service area. Accordingly, a preferred embodiment of the invention divides a cell into a larger number of sectors where the topological and/or morphological makeup of the service area is more complex.

According to the illustrated embodiment, the received power ($S_i$(x,y)) from a BTS of interest ($BTS_i$) is calculated for each service area grid point (x,y) at step 404. For example, in a CDMA system the received signal strength of a pilot signal from $BTS_i$ may be calculated for each service area grid point. This calculation is preferably made for each BTS in the service area as $BTS_i$, and preferably takes into account signal propagation attributes such as shadowing, fading, etcetera.

The interference power ($I_i$(x,y)) associated with all BTSs ($BTS_k$, where k≠i) in the service area other than the BTS of interest ($BTS_i$) is calculated for each service area grid point (x,y) at step 405. For example, in a CDMA system the received signal strength of a pilot signal from $BTS_k$ may be calculated for each service area grid point for inclusion in the interference power at that grid point. The interference from each BTS in the service area is preferably combined to provide the interference power at a particular grid location. As with the received power discussed above, the interference power calculation is preferably made for each BTS in the service area as $BTS_i$ and, therefore, all other combinations of BTSs as $BTS_k$. As with the calculation of the signal of interest discussed above, calculation with respect to the interference power preferably takes into account signal propagation attributes such as shadowing, fading, etcetera. A preferred embodiment equation for calculating $I_i$(x,y) is provided below.

$$I_i(x, y) = \sum_{k \neq i} B_k S_k(x, y) G_k(x, y) \tag{25}$$

At step 406, proposed cell boundaries associated with the BTSs of the service area are determined. Preferably, cell boundaries are determined as a function of the grid points having the best carrier to interference associated with the BTS to be associated with the area of the cell boundary. A preferred embodiment equation for calculating the carrier to interference ratio ($C_i$(x,y)) for a grid point (x,y) associated with a particular BTS ($BTS_i$) signal is provided below.

$$C_i(x, y) = \frac{B_i S_i(x, y) G_i(x, y)}{I_i(x, y)} \tag{26}$$

Having determined proposed cell boundaries, the BTS transmit power utilized in providing communication between a BTS and a subscriber unit at each grid point within the BTS's proposed cell boundary is determined at step 407 of the illustrated embodiment. Preferably, the transmit power ($\overline{P}_i$) utilized with respect to a BTS ($BTS_i$) communicating with a subscriber unit at grid point (x,y) is determined using the following equation, as is discussed in further detail above with respect equation (5) (it being appreciated that $1/S_i$(x,y) appearing in equation (27) below is equivalent to $L_i$(x,y) and, therefore, corresponds to $L_i$(θ,r) appearing in equation (5) above).

$$\overline{P_i}(x, y) = CI_0 \frac{I_i(x, y)}{S_i(x, y)} \tag{27}$$

At step 408, the BTS transmit power utilized in providing communication between a BTS and a subscriber unit at each grid point within the BTS's proposed cell boundary is adjusted for predicted and/or measured subscriber unit density. Preferably, $\overline{P}_i$, as calculated above, is multiplied by the subscriber unit density ($U_i$(x,y)) to modify the BTS transmit power utilized in providing communication between a BTS and a subscriber unit at each grid point for subscriber unit density. Specifically, the methodology described to this point references a grid of substantially arbitrary points. However, in a typical deployment subscriber units will not be equally distributed throughout such a grid and, therefore, the preferred embodiment of the present invention weights profile information according to predicted and/or measured subscriber density. Accordingly for the grid locations where a subscriber unit or units are statistically likely to be disposed, the subscriber density function ($U_i(x,y)$) will provide some scalar of the calculated transmit power. Likewise, for the grid locations where no subscriber unit is statistically likely to be disposed, the subscriber density function ($U_i(x,y)$) will null the calculated transmit power. This preferred embodiment methodology provides a good estimate of the amount of power which is needed to transmit to every grid location in an actual deployment situation.

The cell power profile associated with the proposed cell boundary is determined using the subscriber unit density modified BTS transmit power at step 409. Preferably, the subscriber unit density modified BTS transmit power ($\overline{P}_i(x,y)U_i(x,y)$) associated with each of the BTS sectors (m) is determined using the following equation, as is discussed more fully above with respect to equation (17).

$$p(\theta) = \sum_{i\{\theta m\}} \overline{P_i}(x, y)U_i(x, y) \tag{28}$$

The antenna gain associated with the proposed cell boundary is determined using the cell power profile at step 410. Preferably, the cell power profile ($p(\theta_m)$) determined in step 409 above is utilized in an optimal gain pattern equation as constrained by the antenna gain equation, as described in further detail above with respect to equations (3), (23), and (24) above, to determine an antenna gain profile ($G(\theta_m)$) for use at $BTS_i$ with the proposed cell boundary. An antenna gain profile equation according to a preferred embodiment is provided below, where M is the number of sector angles.

$$G(\theta_m) = \frac{\sqrt{P(\theta_m)}}{\frac{1}{M}\sum_m \sqrt{P(\theta_m)}} \tag{29}$$

In order to determine if the proposed cell boundary provides an optimized configuration with respect to the network, the average total BTS transmit power is calculated at step 411. Preferably, the average total BTS transmit power is calculated using the following equation.

$$B_i = N_u \sum_{x,y} \frac{P_i(x, y)U_i(x, y)}{G_i(x, y)} \tag{30}$$

At step 412 of the illustrated embodiment a determination is made as to whether the calculated average total BTS power is less than a previously calculated average total BTS power by a threshold amount. If the average total BTS power calculated above is not less than a previously calculated average total BTS power by at least a threshold amount, it may be concluded that further iterations of the above steps would not result in significant improvement in the network optimization (e.g., no appreciable change in antenna pattern contouring and thus substantially no further reduction in network interference). Accordingly, the illustrated embodiment proceeds to step 413 to store the BTS antenna gain profile ($G(\theta_m)$) calculated at step 410 and, thereby, adopt the proposed cell boundary determined at step 406, if it is determined at step 412 that the calculated average total BTS power is not less than a previously calculated average total BTS power by a threshold amount.

However, if at step 412 it is determined that the calculated average total BTS power is less than a previously calculated average total BTS power by a threshold amount, the illustrated embodiment returns to step 404 for further refinement of the proposed cell boundary. Accordingly, a subsequent iteration of the above steps will preferably begin with the last calculated cell boundary, power profile, and antenna gain profile, rather than the unity gain configuration initially adopted at step 401, to facilitate convergence upon the optimum configuration. Specifically, after the first iteration of the illustrated embodiment described above, the new antenna patterns change the S(x,y) and I(x,y) across the network, consequently cell boundaries are changed and new power profiles are generated. Correspondingly, based upon the new power profiles, new antenna patterns are generated. It is expected that two to ten iterations according to the preferred embodiment will result in an optimized configuration and, thus, the final antenna gain profile ($G(\theta_m)$) to be adopted according to the preferred embodiment.

It should be appreciated that the threshold value used for determining a satisfactory convergence on an optimized configuration may be selected as a function of various considerations. For example, the smaller the threshold value selected, the larger the number of iterations required for convergence and, therefore, the more processing time and resources required for determining an optimized configuration. However, the larger the threshold value selected, the less likely a determined optimized configuration is to converge upon an ideal optimization configuration. Accordingly, the threshold value should be selected with consideration of the time and resources available for use according to the present invention, the improvement desired with respect to network operations, and the like.

Assuming the shadowing from different BTSs is uncorrelated, less loss in a particular direction from a particular BTS increases its coverage at that direction according to the preferred embodiment of the present invention. This causes the power profile to increase in that direction and, thereby, allow for more users. As a result, the determined antenna gain, using the above expression, increases. Correspondingly, increase of the loss in a particular direction from the particular BTS causes an inverse reaction. This effect works well with the throughput maximization described above, i.e., antenna gain is increased toward all grid points that have better "connectivity" to the BTS and visa versa.

Implementation of the above preferred embodiment steps for optimizing antenna pattern contours in a network has been simulated to verify the resulting improvement. As discussed above, FIG. 2B shows the antenna pattern contours resulting from a Monte-Carlo simulation, in which seven cells of a network (cells 110, 120, 130, 240, 250, 260, and 270 arranged in a sphere network) are modeled. The Monte-Carlo simulation utilized a variable number of subscriber units with path loss modeling and ideal power control. Outage was defined in the simulation as the probability of an inability to support the required service (number of subscriber units).

Figure 5A:
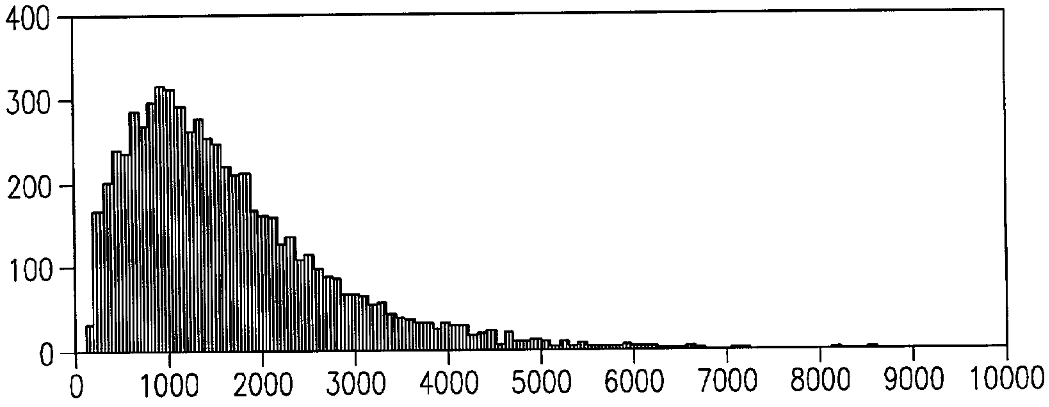
FIG. 5A shows a histogram of base station transmit power without antenna pattern contouring of the present invention.
Figure 5B:
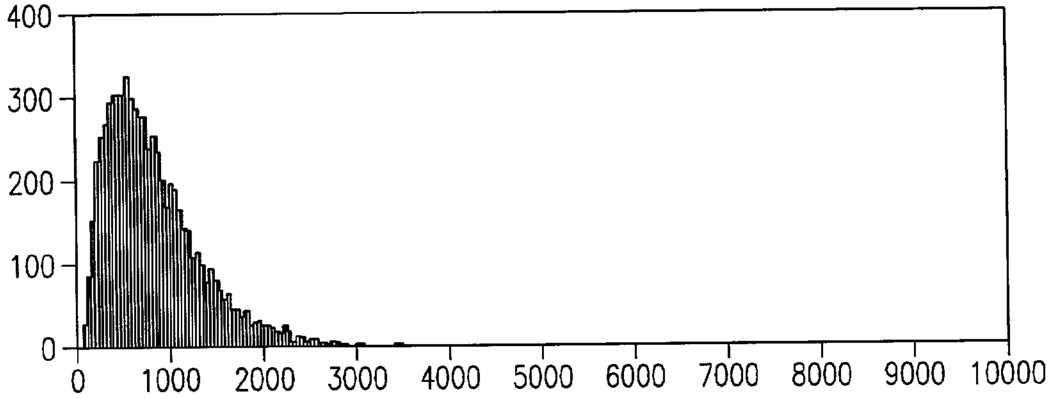
FIG. 5B shows a histogram of base station transmit power with antenna pattern contouring of the present invention.

FIG. 5A shows a histogram of BTS transmit power without antenna pattern contouring of the present invention and FIG. 5B shows a histogram of BTS transmit power with antenna pattern contouring of the present invention as provided in the Monte-Carlo simulation. In FIGS. 5A and 5B, the horizontal axis shows the BTS power and the vertical axis shows the number of times a particular BTS transmit power level is required. From the histograms of FIGS. 5A and 5B it can be seen that the typical maximum transmit power reduction for 2% outage is approximately 50%. Similarly, it can be seen that the typical outage reduction for a given BTS transmit power is approximately 90%. That is to say that using the antenna pattern contouring of the present invention, the number of times a BTS transmits at a higher power level is reduced significantly.

Figure 6:
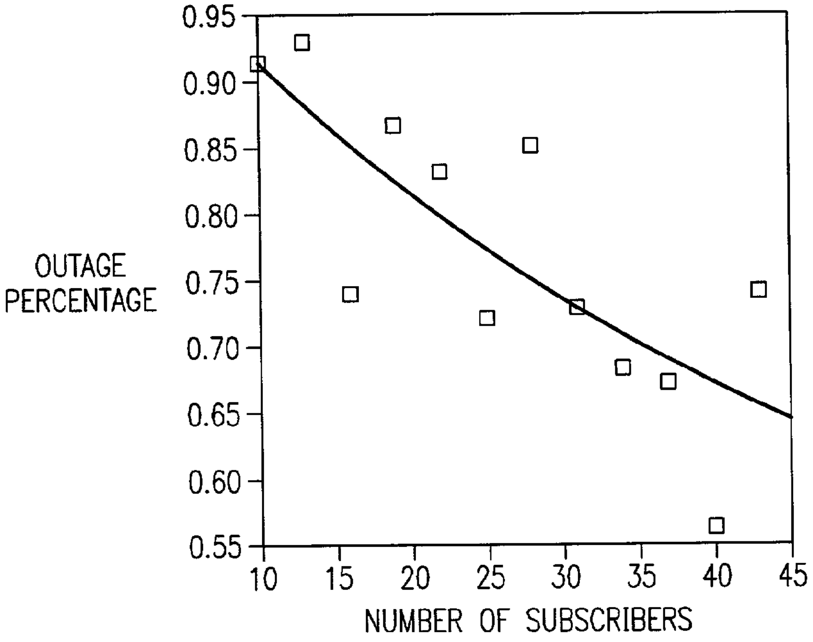
FIG. 6 shows the improvement of outage probability verses the number of subscriber units resulting from implementing a preferred embodiment of the present invention.

FIG. 6 shows the improvement of outage probability verses the number of subscriber units (relative to 2% outage), where the horizontal axis shows number of subscriber units and the vertical axis shows the outage probability. Adjusting the BTS transmit power to keep the outage at 2% while increasing the number of subscriber units served, the use of antenna pattern contouring according to the present invention causes a dramatic reduction in the outage probability. For example, where 25 subscriber units are being served, the probability of outage using the antenna pattern contouring of the present invention is approximately 0.75%, as compared to 2% in a typical system configuration. It should be appreciated that the probability of outage decreasing with the number of users is indicative of a very stable network configuration. Typically the introduction of additional subscriber units results in a positive feedback type response wherein power to each subscriber unit must be increased to compensate for the added interference associated with the added subscriber units. At some point this situation will reach a critical point at which network communications are not possible. However, implementation of the present invention as simulated supports a large number of subscribers without approaching a critical point.

Figure 7:
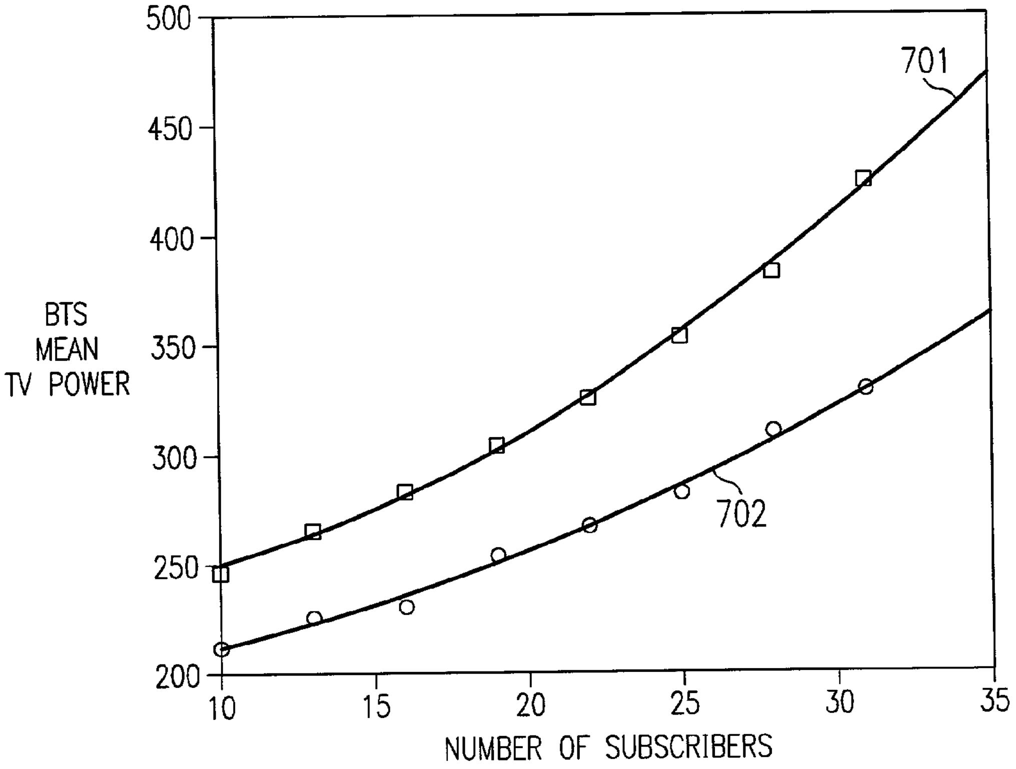
FIG. 7 shows the reduction in base station transmit power associated with antenna pattern contouring according to a preferred embodiment of the present invention.

FIG. 7 shows the reduction in BTS transmit power for 2% outage associated with antenna pattern contouring according to the present invention, where the horizontal axis shows the number of subscribers and the vertical axis shows the BTS mean transmit power. Line 701 of FIG. 7 shows the BTS transmit power associated with a conventional configuration and line 702 of FIG. 7 shows the BTS transmit power associated with implementation of antenna pattern contouring according to the present invention. It can be seen that the maximum total BTS transmit power as a function of the number of subscribers increases much slower when antenna beam contouring of the present invention is applied. Additionally, it can be seen that the amount of saved power is increased as a function of the number of subscribers. Accordingly, contrary to conventional thinking, the implementation of the present invention provides for signal quality improvement as the subscriber load increases.

Figure 8:
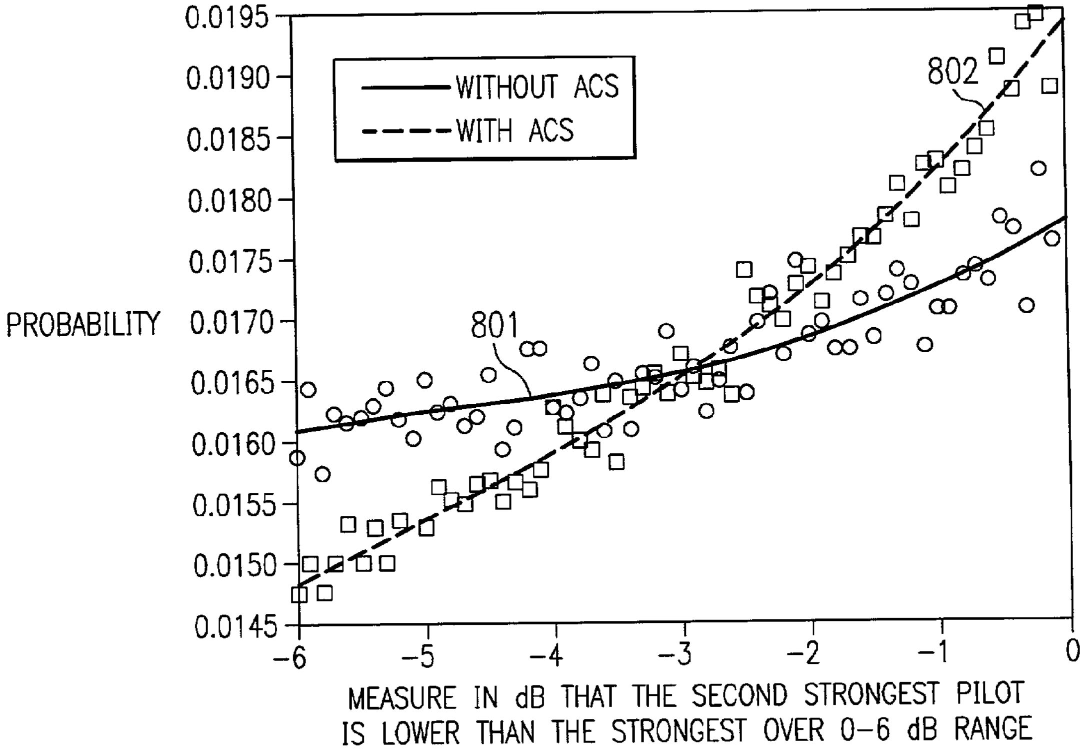
FIG. 8 shows a pilot pollution probability distribution function.

FIG. 8 shows a pilot pollution probability distribution function, where the horizontal axis shows the measure in dB that the second strongest pilot is lower than the strongest pilot and the vertical axis shows the probability. Line 801 of FIG. 8 shows the pilot pollution probability distribution function associated with a conventional configuration and line 802 of FIG. 8 shows the pilot pollution probability distribution function associated with implementation of antenna pattern contouring according to the present invention. Pilot pollution is defined with respect to the graph of FIG. 8 as the probability to have additional pilots that are within less than a particular threshold of the main pilot in the handoff area. It can be seen that implementation of antenna pattern contouring according to the present invention reduces pilot pollution by approximately 25%.

The sculpturing capability, or the resolution of the azimuthal contouring, is typically related to a number of elements in the array. To significantly change the cell footprint, antenna arrays utilized according to the present invention should have sufficient numbers of antenna elements (in the preferred embodiment, columns) allowing aggressive beam synthesis. Therefore, the present invention preferably utilizes antenna arrays having a relatively large number of antenna elements, whether disposed in a linear or curvilinear configuration, to provide aggressive beam sculpting, such as may be utilized to address topological and morphological features to result in desired cell contours. For example, antenna arrays provided in panel or conic configurations such as shown and described in the above referenced patent application entitled "Dual Mode Switched Beam Antenna" and in commonly owned U.S. Pat. No. 6,188,272 entitled "System and Method for Per Beam Elevation Scanning," the disclosure of which is hereby incorporated herein by reference, may be utilized according to the present invention. The use of curvilinear arrays may be advantageous in particular situations due to the ability to typically generate wider beams (e.g., 200° beam widths) with such arrays.

Antenna arrays utilized according to the present invention are preferably coupled to a feed network providing desired signal manipulation, e.g., complex weighting of signals providing amplitude and/or phase relationships of signals associated with the antenna elements of the array, to provide the above described beam sculpting. It should be appreciated that typical prior art beam shaping solutions, such as those using adaptive beam forming responsive to a mobile unit's position, utilize a beam-forming device requiring a significant amount of hardware (LPAs, controllable phase shifters, etc.), some or all of which are not well suited for deployment at a masthead or tower-top with an antenna array, which adds to the expense and/or complexity of such systems. Preferred embodiments of the present invention implement passive networks for providing aggressive beam sculpting thereby allowing low cost use of many elements, allowing aggressive sculpting, to thereby provide cell boundaries as described above. Such embodiments may be deployed at the masthead as part of the antenna array assembly. This arrangement relieves the need for a large amount of hardware as mentioned above and, hence, allows for larger number of antenna elements in the array as required for aggressive sculpturing.

Preferred embodiment feed networks utilized according to the present invention comprise microstrip line and/or air-line busses which may be relied upon to conduct signals and provided desired manipulation of attributes thereof. For example, air-line transmission lines may be adapted to provide desired signal power splitting, such as through providing junctions having desired impedance relationships, and/or delays, such as through providing line lengths associated with desired amounts of propagation delay. Preferred embodiment feed networks provide a "personality module" which may be disposed at the masthead with the antenna array to provide operation as described herein. Such personality modules may be adapted for easy connection to an antenna array and transmission cables to facilitate simplified deployment and replacement in the field.

For example, a passive feed network comprised of microstrip lines on a printed circuit card may be disposed in a portable housing, such as a rectangular metal cowling, having sliding friction connectors on one end to slidably engage corresponding connectors of an antenna array and coaxial connectors on another end to engage transmission cables. Accordingly, a field service representative may ascend an antenna mast, remove coaxial connectors of the transmission lines, slidably disengage a previously deployed personality module, slidably engage a replacement personality module, and connect coaxial connectors of the transmission lines to thereby change the antenna pattern contour of the BTS, such as in response to morphological, topological, or even temporal changes.

Of course, there is no limitation of the present invention that sliding friction connectors and/or coaxial connectors be used with respect to such personality modules. Any form of connector providing the ability to field exchange personality modules of the present invention may be utilized. However, preferred embodiments utilize connectors adapted to provide reliable and quality signal transmission under the expected operational conditions and which are relatively easy to engage and disengage to facilitate a speedy, one man, deployment.

Figure 9:
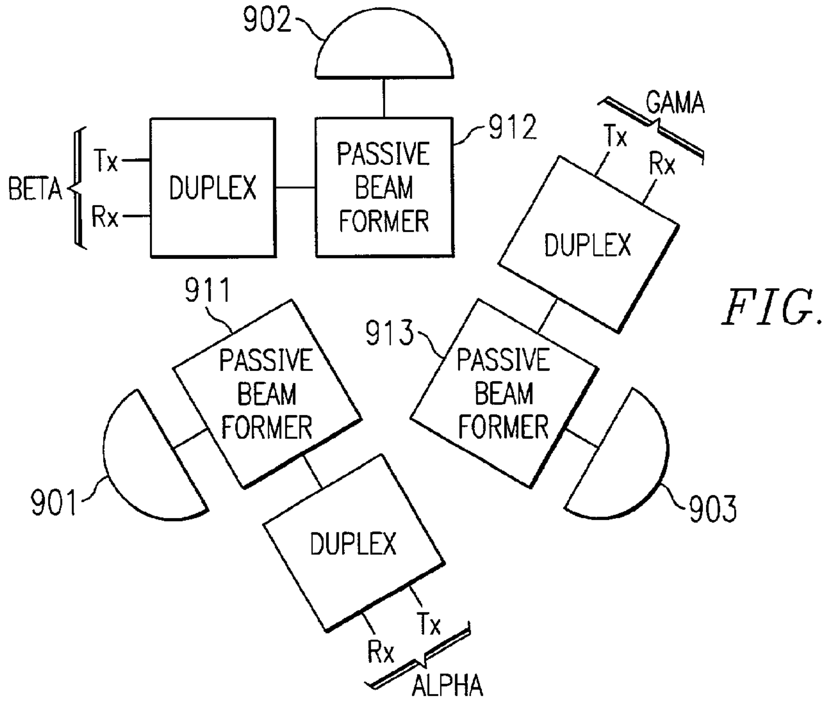
FIG. 9 shows a preferred embodiment of base transceiver station equipment configured according to a preferred embodiment of the present invention.
Figure 10:
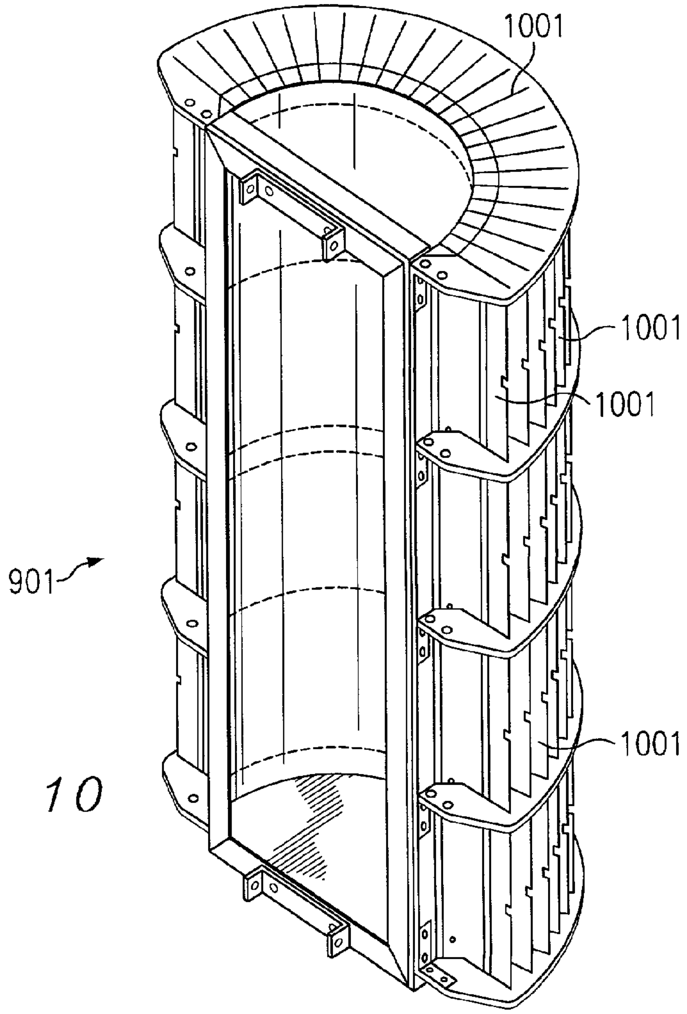
FIG. 10 shows detail with respect to a preferred embodiment antenna array as may be implemented in the configuration of FIG. 9.

A preferred embodiment system implementing the present invention is illustrated schematically in FIGS. 9 and 10. Specifically, an arrangement of curvilinear arrays, here half dome arrays 901–903, are shown using simple passive beam forming networks of a preferred embodiment, here passive beam formers 911–913, to provide cell sculpting and antenna pattern contouring of the present invention with a desired level of diversity performance in the links. The preferred embodiment curvilinear arrays are sections of a cylindrical antenna structure, such as shown in further detail in FIG. 10. For example, each curvilinear array may consist of any number of antenna elements 1001, preferably arranged in columns, which when coupled to the beam formers provides desired antenna beam patterns.

The use of such curvilinear arrays is advantageous when a desired beam width is relatively large, such as beam widths greater than 120°. For example, the above described preferred embodiment half dome arrays are capable of forming very wide beams, such as on the order of 200° or more, thereby leveraging the use of the preferred embodiment simple passive beam forming networks.

Embodiments of the present invention may be adapted to provide signal diversity, if desired. For example, multiple antenna arrays, such as shown in FIG. 10, may be implemented with respect to a particular sector to provide signal diversity. Alternatively, an antenna array, such as shown in FIG. 10, and a conventional sector antenna may be implemented with respect to a particular sector to provide signal diversity.

Additionally or alternatively, dual polarization may be utilized according to the present invention. For example, interleaved antenna element columns of orthogonally polarized elements as shown in the above referenced U.S. Pat. No. 6,188,272 entitled "System and Method for Per Beam Elevation Scanning," may be utilized where a first polarization (e.g., 45° polarization) provides a first section and a second polarization (e.g., −45° polarization) provides a second section of the above example.

Although embodiments of the present invention have been described with reference to the use of curvilinear arrays, it should be appreciated that linear arrays, such as flat panel arrays, may be utilized according to the present invention. Such flat panel arrays may be utilized substantially as described above with respect to the curvilinear arrays where more narrow beam widths are desired, such as beam widths of 120° and less (although where wider beam widths are desired a plurality of such flat panel arrays may be used with the appropriate feed circuitry to allow beam forming across multiple panels). Moreover, such flat panel arrays having personality modules of the present invention may be used to directly replace existing BTS antennas to thereby provide advantages of the present invention without requiring substantial alteration of the BTS.

It should be appreciated that, although described above with reference to signals radiated from the BTSs (i.e., the forward link), cell sculpting of the present invention may be utilized in any link direction, whether forward or reverse links, and with communication systems other than the preferred embodiment BTSs. Moreover, although discussed with reference to sector antenna arrays, the present invention is not limited to use with sector antenna arrays or even with sectorized systems.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing improved wireless communication, said method comprising:

determining a path loss profile with respect to a first base station in a communication network; and providing an antenna array at said first base station having an antenna gain profile substantially inversely proportional to said path loss profile.

2. The method of claim 1, further comprising:

determining path loss profiles with respect to a plurality of base stations in said communication network;

determining a proposed antenna gain profile for said first base station as a function of said path loss profile with respect to said first base station and said path loss profiles with respect to said plurality of base stations;

determining a proposed antenna gain profile for each base station of said plurality of base stations as a function of said path loss profile with respect to said first base station and said path loss profiles with respect to said plurality of base stations; and repeating said determining said proposed antenna gain profile for said first base station and said determining said proposed antenna gain profile for each base station of said plurality of base stations until said antenna gain profile for said first base station and said antenna gain profiles for each base station of said plurality of base stations are determined to provide a configuration in which a substantially minimized average transmit power associated with operation of each said base station, wherein said antenna gain profile provided to said antenna array at said first base station corresponds to said proposed antenna gain profile for said first base station associated with said configuration providing said substantially minimized average transmit power.

3. The method of claim 2, further comprising:

determining signal quality metrics with respect to transmission by each base station of said first base station and said plurality of base stations as received at a plurality of subscriber positions in said communication network, wherein said signal quality metrics are determined as a function of said path loss profile with respect to said first base station and said path loss profiles with respect to said plurality of base stations and said proposed antenna gain profiles are determined as a function of said signal quality metrics; and repeating said determining said signal quality metrics when said determining said proposed antenna gain profile for said first base station and said determining said proposed antenna gain profile for each base station of said plurality of base stations are repeated, wherein said proposed antenna gain profiles are used with respect to a respective one of said first base station and said plurality of base stations for said repeating determining said signal quality metrics.

4. The method of claim 3, wherein said signal quality metrics comprise a carrier to interference ratio.

5. The method of claim 3, further comprising:

determining a density of subscriber units with respect to said subscriber positions, wherein said proposed antenna gain profile for said first base station and said antenna gain profiles for said plurality of base stations are weighted according to said subscriber unit density.

6. The method of claim 1, further comprising:

determining a signal quality metric with respect to a plurality of subscriber positions in said communication network, wherein said signal quality metric is determined as a function of said path loss profile; and determining a density of subscriber units with respect to said subscriber positions, wherein said substantially inverse proportional relationship of said antenna gain profile to said path loss profile is determined as a function of said signal quality metric and said subscriber unit density.

7. The method of claim 6, further comprising:

determining a path loss profile with respect to a plurality of base stations in said communication network;

determining said signal quality metric as a function of a receive signal characteristic associated with said first base station at said plurality of subscriber positions and a receive signal characteristic associated with said plurality of base stations at said plurality of subscriber positions, wherein said receive signal characteristics associated with said first base station and said plurality of base stations are a function of a corresponding one of said path loss profiles.

8. The method of claim 7, further comprising:

selecting said plurality of base stations from base stations of said communication network as a function of base stations likely to present interfering signals with respect to subscriber units disposed in a service area associated with said first base station.

9. The method of claim 6, further comprising:

gridding at least a portion of said communication network to identify said plurality of subscriber positions.

10. The method of claim 9, wherein a resolution of said grid is determined as a function of morphological attributes of said communication network.

11. The method of claim 9, wherein a resolution of said grid is determined as a function of topological attributes of said communication network.

12. The method of claim 1, wherein said determining a path loss profile utilizes topological and morphological attributes of said communication network.

13. A method for providing improved wireless communication, said method comprising:

determining a path loss profile with respect to a first base station in a communication network;

determining a density of subscriber units with respect to at least a portion of said communication network;

determining an antenna gain profile which is substantially inversely proportional to said path loss profile and substantially proportional to said subscriber unit density; and coupling an antenna feed network providing said antenna gain profile to an antenna array at said first base station.

14. The method of claim 13, wherein said antenna feed network is provided in a portable housing.

15. The method of claim 14, wherein said portable housing comprises connectors adapted to slidably engage corresponding connectors of said first base station.

16. The method of claim 14 wherein said portable housing comprises a metal cowling and said antenna feed network comprises a microstrip feed network.

17. The method of claim 14, wherein said antenna feed network is one of a plurality of antenna feed networks, wherein ones of said antenna feed networks provide different antenna gain profiles.

18. The method of claim 17, further comprising:

removing an antenna feed network providing an antenna gain profile other than said determined antenna gain profile.

19. The method of claim 18, wherein said removing said antenna feed network and said coupling said antenna feed network are provided in response to morphological changes in said communication network.

20. The method of claim 18, wherein said removing said antenna feed network and said coupling said antenna feed network are provided in response to seasonal changes in said communication network.

21. The method of claim 13, further comprising:

determining a signal quality metric with respect to a plurality of subscriber positions in said communication network, wherein said signal quality metric is determined as a function of said path loss profile.

22. The method of claim 21, further comprising:

gridding at least a portion of said communication network to identify said plurality of subscriber positions.

23. The method of claim 22, wherein a resolution of said grid is determined as a function of morphological attributes of said communication network.

24. The method of claim 22, wherein a resolution of said grid is determined as a function of topological attributes of said communication network.

25. The method of claim 21, wherein said signal quality metric is utilized with said subscriber unit density in determining said antenna gain profile.

26. The method of claim 13, further comprising:

determining path loss profiles with respect to a plurality of base stations in said communication network; and determining carrier to interference ratios for a plurality of subscriber positions in said communication network associated with transmission of signals from each base station of said first base station and said plurality of base stations, wherein said carrier to interference ratios are determined as a function of said path loss profiles with respect to said plurality of base stations and said path loss profile with respect to said first base station.

27. The method of claim 26, wherein said determining said antenna gain profile comprises:

determining subscriber positions of said plurality of subscriber positions having a most desirable carrier to interference ratio associated with said first base station and determining a proposed antenna gain profile for use by said first base station in providing communications to said subscriber positions; and determining subscriber positions of said plurality of subscriber positions having a most desirable carrier to interference ratio associated with each base station of said plurality of base stations and determining a proposed antenna gain profile for use by a corresponding base station of said plurality of base stations in providing communications to said subscriber positions.

28. The method of claim 27, further comprising:

repeating said determining said carrier to interference ratios using said proposed antenna gain profile for use by said first base station and said proposed antenna gain profile for use by said corresponding base station; and repeating said determining said antenna gain profile.

29. The method of claim 28, wherein said repeating said determining said carrier to interference ratios and said repeating said determining said antenna gain profile cause said determined antenna gain profile to converge upon a configuration having a minimized average transmit power.

30. A method for providing improved wireless communication, said method comprising:

determining a potential throughput metric for a plurality of subscriber positions in a communication network;

determining a power profile for communication between subscriber positions of said plurality of subscriber positions and a first base station of said communication network substantially providing said potential throughput metric, wherein said determining a potential throughput metric and said determining a power profile are repeated for a plurality of iterations to converge upon an optimized antenna gain profile configuration; and providing an antenna array at said first base station having an antenna gain profile substantially proportional to said power profile.

31. The method of claim 30, further comprising:

determining a total average power metric using said determined power profile; and comparing said determined total average power metric to a total average power metric of a previous iteration of said determining a potential throughput metric and said determining a power profile.

32. The method of claim 31, wherein said plurality of iterations are determined to satisfactorily converge upon said optimized antenna gain profile configuration when said determined total average power metric is within a predetermined threshold value of said total average power metric of said previous iteration.

33. The method of claim 30, wherein said determining said potential throughput metric comprises:

determining a potential signal quality metric, wherein said potential signal quality metric is with respect to a signal of a first base station of said communication network.

34. The method of claim 33, wherein said determining said potential signal quality metric comprises:

determining a path loss profile with respect to said first base station;

determining a path loss profile with respect to a plurality of base stations in said communication network, said plurality of base stations being exclusive of said first base station;

determining said potential signal quality metric as a function of a receive signal characteristic associated with said first base station at said plurality of subscriber positions and a receive signal characteristic associated with said plurality of base stations at said plurality of subscriber positions, wherein said receive signal characteristics associated with said first base station and said plurality of base stations are a function of a corresponding one of said path loss profiles.

35. The method of claim 30, wherein said providing an antenna array comprises:

configuring a passive beam forming network to result in said antenna gain profile.

36. The method of claim 35, wherein said passive beam forming network is configured as an interchangeable personality module with respect to said antenna array to thereby facilitate modification of said antenna gain profile.

37. The method of claim 36, further comprising:

repeating said determining a potential throughput metric and said determining a power profile in response to a change in morphological attributes in said communication network; and changing said personality module to thereby modify said antenna gain profile in accordance with said repeated determinations.

38. An antenna system comprising:

an antenna array having a relatively large number of antenna elements which have different signal weighting characteristics associated therewith to thereby provide a desired antenna gain profile; and a feed network coupled to said antenna array to provide said different signal weighting characteristics of said desired antenna gain profile, wherein said desired antenna gain profile is substantially inversely proportional to a path loss profile associated with said antenna array.

39. The system of claim 38, wherein said desired antenna gain profile is configured to provide gain as a function of subscriber unit density.

40. The system of claim 38, wherein said feed network comprises:

an interchangeable personality module.

41. The system of claim 38, wherein said antenna array and said feed network are coupled to a cellular base transceiver station.

42. A method for providing improved wireless communication, said method comprising:

determining a potential throughput metric for a plurality of subscriber positions in a communication network;

determining a power profile for communication between subscriber positions of said plurality of subscriber positions and a first base station of said communication network substantially providing said potential throughput metric; and providing an antenna array at said first base station having an antenna gain profile substantially proportional to said power profile;

wherein said determining a power profile comprises:

determining a density of subscriber units with respect to said subscriber positions;

determining communication powers associated with transmission of a signal between said first base station and subscriber positions of said plurality of subscriber positions substantially providing said potential throughput metric; and weighting said determined communication powers using said determined subscriber unit density.

43. The method of claim 42, wherein said providing an antenna array comprises:

configuring a passive beam forming network to result in said antenna gain profile.

44. The method of claim 43, wherein said passive beam forming network is configured as an interchangeable personality module with respect to said antenna array to thereby facilitate modification of said antenna gain profile.

* * * * *